(12) United States Patent
Zhang et al.

(10) Patent No.: US 10,261,658 B2
(45) Date of Patent: Apr. 16, 2019

(54) AUTOMATING USER OPERATIONS USING SCREEN SHOTS AND FILE NAMES

(71) Applicant: Adobe Inc., San Jose, CA (US)

(72) Inventors: Jun Zhang, Beijing (CN); Weihua Li, Beijing (CN); Zhilei Yang, Beijing (CN)

(73) Assignee: ADOBE INC., San Jose, CA (US)

( * ) Notice: Subject to any disclaimer, the term of this patent is extended or adjusted under 35 U.S.C. 154(b) by 419 days.

(21) Appl. No.: 14/525,909

(22) Filed: Oct. 28, 2014

(65) Prior Publication Data

US 2016/0117341 A1 Apr. 28, 2016

(51) Int. Cl.
| | |
|---|---|
| *G06F 3/0482* | (2013.01) |
| *G06F 3/0484* | (2013.01) |
| *G06F 9/451* | (2018.01) |
| *G06F 3/0481* | (2013.01) |
| *G06F 8/34* | (2018.01) |
| *G06F 16/583* | (2019.01) |

(52) U.S. Cl.
CPC .......... *G06F 3/0482* (2013.01); *G06F 3/0481* (2013.01); *G06F 3/04817* (2013.01); *G06F 3/04842* (2013.01); *G06F 8/34* (2013.01); *G06F 9/451* (2018.02); *G06F 16/583* (2019.01)

(58) Field of Classification Search
CPC .. G06F 3/0482; G06F 3/0481; G06F 3/04817; G06F 3/04842; G06F 8/34; G06F 9/4443; G06F 17/30247
See application file for complete search history.

(56) References Cited

U.S. PATENT DOCUMENTS

| 8,171,406 | B1* | 5/2012 | Newstadt | G06F 9/4443 |
| | | | | 715/700 |
| 8,417,667 | B1* | 4/2013 | Lefevre | G06F 17/30144 |
| | | | | 707/609 |
| 9,135,714 | B1* | 9/2015 | Gauf | G06T 7/0085 |
| 2002/0049748 | A1* | 4/2002 | Iki | G06F 17/30067 |
| 2002/0107653 | A1* | 8/2002 | Kraffert | G06F 11/3672 |
| | | | | 702/119 |
| 2009/0199096 | A1* | 8/2009 | Pop-Jordanov | G06F 11/3692 |
| | | | | 715/704 |
| 2009/0320002 | A1* | 12/2009 | Peri-Glass | G06F 8/38 |
| | | | | 717/131 |

(Continued)

OTHER PUBLICATIONS

Givens, "Exploring the Internal State of User Interfaces by Combining Computer Vision Techniques with Grammatical Inference", Proceedings of the 2013 International Conference on Software Engineering (ICSE '13), pp. 1165-1168, May 2013.*

(Continued)

*Primary Examiner* — Li P Sun
*Assistant Examiner* — Joseph R. Burwell
(74) *Attorney, Agent, or Firm* — Keller Jolley Preece

(57) ABSTRACT

Methods for automating user operations include analyzing a name of an image file to identify an operation to be automated. One or more embodiments compare a content of the image file to a graphical user interface of a computing device to identify a location of a graphical user interface element in the graphical user interface. One or more embodiments perform the operation identified from the name at the location of the graphical user interface element identified from the content of the image file.

20 Claims, 10 Drawing Sheets

(56) References Cited

U.S. PATENT DOCUMENTS

| | | | | |
|---|---|---|---|---|
| 2012/0174000 A1* | 7/2012 | Zavatone | .................. | G06F 8/38 715/763 |
| 2012/0174069 A1* | 7/2012 | Zavatone | ............ | G06F 11/3692 717/124 |
| 2012/0243745 A1* | 9/2012 | Amintafreshi | ...... | G06F 11/3692 382/103 |
| 2013/0019171 A1* | 1/2013 | Mounty | .............. | G06F 11/3688 715/704 |
| 2013/0046801 A1* | 2/2013 | Chandler | .......... | G06F 17/30115 707/822 |
| 2014/0033091 A1* | 1/2014 | Schein | .................. | G06F 9/4443 715/764 |

OTHER PUBLICATIONS

Yeh, Tom, Chang, Tsung-Hsiang, Miller, Robert C.: Sikuli: Using GUI Screenshots for Search and Automation. Proceedings of the 22nd annual ACM symposium on User interface software and technology (UIST 2009), Oct. 4-7, 2009, pp. 183-192, Victoria, British Columbia, Canada.

Automa API Documentation, BugFree Software, Jul. 24, 2014, pp. 1-13.

* cited by examiner

| Time | Message | Result | File |
|---|---|---|---|
| 2014-09-16 09:25:06 | ##### Test Start | | |
| 2014-09-16 09:25:06 | #Right Click "C:\desktop\1.r.png" | [Successful] at 463, 0 | 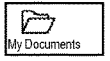 My Documents |
| 2014-09-16 09:25:09 | #Move to "C:\desktop\2.m.png" | [Successful] at 515, 403 |  New |
| 2014-09-16 09:25:10 | #Single Click "C:\desktop\3.s..png" | [Successful] at 838, 405 | 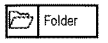 Folder |
| 2014-09-16 09:25:10 | -Start Keyboard Entry from file "C:\desktop\4.k.txt" | | |
| 2014-09-16 09:25:11 | #Execute keystroke command: "p" | | |
| 2014-09-16 09:25:12 | #Execute keystroke command: "h" | | |
| 2014-09-16 09:25:13 | #Execute keystroke command: "o" | | |
| 2014-09-16 09:25:12 | #Execute keystroke command: "t" | | |
| 2014-09-16 09:25:13 | #Execute keystroke command: "o" | | |
| 2014-09-16 09:25:13 | #Execute keystroke command: "s" | | |
| 2014-09-16 09:25:14 | #Execute keystroke command: "enter" | | |
| 2014-09-16 09:25:14 | -End Keyboard Entry from file "C:\Filepath\4.k.txt" | | |
| 2014-09-16 09:25:14 | ##### Test End: Successful | | |
| 2014-09-16 09:25:15 | The log has been save to file: \log20140916091727.7584.htm | | |

*Fig. 4*

Mouse/Touch Operations

| Operation | File and Folder Format | Example |
|---|---|---|
| Single Click | ./order.S[.description].png | ./8.S.ok.png |
| Double Click | ./order.D[.description].png | ./3.D.png |
| Right Click | ./order.R[.description].png | ./3.R.Icon.png |
| Selection | ./order.Select[.description].png | ./3.Select.png |
| Drag and Drop | ./order.Dragdrop[.description]./drag.png<br>./order.Dragdrop[.description]./drop.png | ./9.dragdrop/drag.png<br>./9.dragdrop/drop.png |

Keyboard Operations

| Operation | File and Folder Format | Example |
|---|---|---|
| Keyboard Entry | ./order.K[.description] | ./4.K.txt |
| Keep Key | ./order.Keep[.description]/Key.txt<br>./order.Keep[.description]/operation/ | ./3.keep/key.txt<br>./3.keep/operation |

*Fig. 5*

AUTOMATING USER OPERATIONS USING SCREEN SHOTS AND FILE NAMES

BACKGROUND

1. Technical Field

One or more embodiments relate generally to systems and methods for operation automation. More specifically, one or more embodiments relate to systems and methods of automating user operations based on graphical user interface screenshots.

2. Background and Relevant Art

Automation software allows users to perform one or more operations without manually performing each of the operations. Performing one or more operations without requiring manual input from a user, allows users to quickly and easily accomplish tasks. In graphical user interfaces, operations can include mouse operations and/or keyboard operations for interacting with graphical user interface elements (e.g., folders and files) and/or applications within the graphical user interface. Automating operations in association with a graphical user interface can improve a user's productivity and efficiency. Simplifying such tasks can reduce manual repetitions of simple and/or complex operations, thereby reducing the time to perform the tasks.

In order to automate operations in a computing environment, conventional automation software typically interacts with the computing device using a specialized programming language to instruct the device to perform the operations. Some conventional automation software requires users to have extensive knowledge of the specialized programming language to be able to correctly automate the operations. For example, automation software can require a user to know syntax, inputs, outputs, and/or other information associated with the programming language for each operation. People without knowledge of the specific programming language may not be able to perform automation for even simple operations.

Furthermore, even users with knowledge of a specialized programming language may have difficulty setting up a script or macro for performing automated operations. Specifically, scripts and macros that control graphical user interface elements refer to the graphical user interface elements by name. Unfortunately, such names may be unknown, unfamiliar, or even unavailable to a user. Alternatively, some conventional automation methods allow a user to control graphical user interface elements using location of the elements. Such methods can be problematic and subject to errors as graphical user interface elements often change location.

In some instances, a user may want to verify that an automated process is performing each operation correctly. Conventional automation methods often require a user to debug the automated process by manually verifying each step individually as the user sets up the automation. Consequently, debugging automated processes can be time consuming, especially for automated processes that include a large number of automated operations or that include complex operations.

These and other disadvantages may exist with respect to conventional operation automation techniques.

SUMMARY

One or more embodiments provide benefits and/or solve one or more of the foregoing or other problems in the art with systems and methods for automating user operations. For example, one or more embodiments involve identifying a specific operation to perform based on a name and content of an image file. Specifically, a user can take screen shots of graphical user interface elements and name screen shots with a name that indicates which operation the user desires the automation process to perform with regard to the graphical user interface.

Thus, one or more embodiments can include analyzing a name of an image file to identify an operation to be performed as part of an automated process. Additionally, one or more embodiments can include identifying a location of a graphical user interface element in a graphical user interface that corresponds to the content of the image file. After identifying the operation from the name of the image file and a location a corresponding graphical user interface element from the content of the image file, one or more embodiments can automatically perform the operation.

The systems and methods disclosed herein can provide improvements in automating user operations by providing a file naming convention for indicating the operations. In particular, determining an operation based on the name of a data file can allow a user to describe the operation by naming the image file using a simple file naming convention for the image file. By using the file name of an image file to indicate an operation, a user can indicate an operation to be automated without having to know a specific programming language or remember complex language syntax.

Furthermore, one or more embodiments provide a way for users to intuitively indicate where to perform the operation. Specifically, one or more embodiments allow users to identify a location of a corresponding graphical user interface element by capturing a screenshot of the corresponding graphical user element and storing the screenshot in the image file. Thus, one or more embodiments provide a visual and intuitive way for users to easily create an automated process.

Additional features and advantages of one or more embodiments will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features may be obtained, a more particular description of embodiments systems and methods briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, the systems and methods will be described and explained with additional specificity and detail through the use of the accompanying drawings in which:

FIG. 4 illustrates a table diagram of an operation log of an automation process in accordance with one or more embodiments;

FIG. 5 illustrates a table diagram of a set of user operations and corresponding file names in accordance with one or more embodiments;

DETAILED DESCRIPTION

Figure 1:
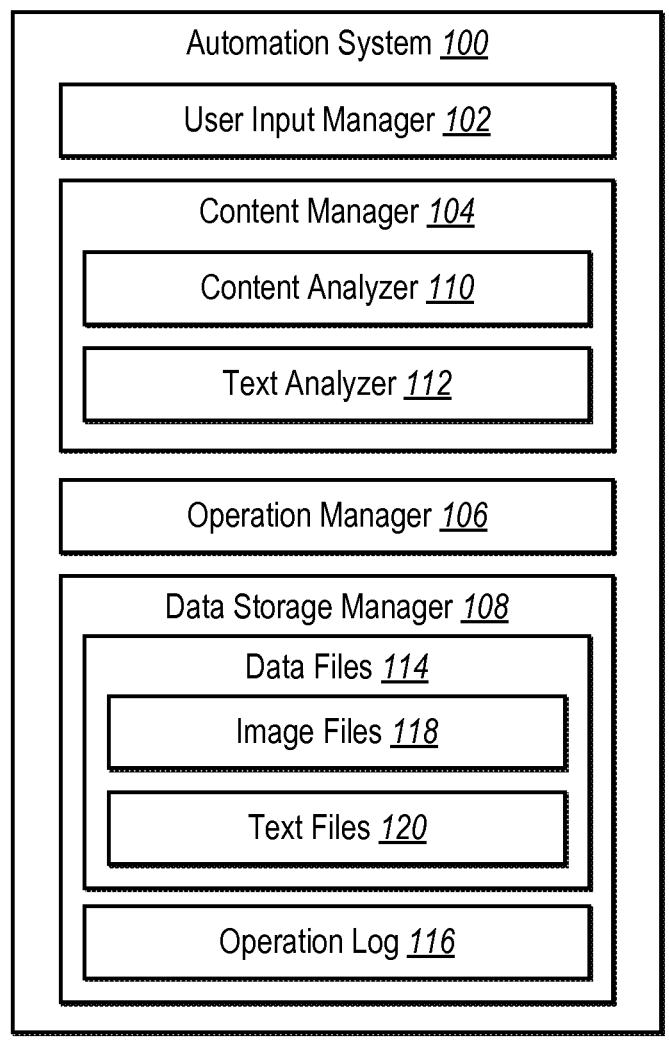
FIG. 1 illustrates a schematic diagram of an automation system in accordance with one or more embodiments.

One or more embodiments include an automation system that allows users to intuitively create automation instructions or otherwise automate user actions within the content of a graphical user interface. The automation system automates user operations based on screenshots and file naming conventions. In particular, the automation system can identify operations to automate based on the names of files. For example, the automation system can analyze the name of an image file to identify an operation to automate. Additionally, the automation system can compare the content of an image file to a graphical user interface to identify a location in the graphical user interface for performing the operation. One or more embodiments of the automation system can then perform an operation identified from the name of the image file at the location corresponding to the content of the image file.

Specifically, the automation system can analyze the name of the data file to identify the operation. The automation system can then analyze the content of the data file to determine a context (e.g., where and how) for the operation. After identifying the operation from the name of the data file and determining the context for the operation from the content of the data file, the automation system can perform the identified operation according to the determined context. Performing one or more operations in an automated process based on the name and content of one or more data files allows users to simply and easily set up the automated process without having to learn a programming language.

In particular, the automation system can allow a user to create automation instructions or automate a process using simple actions with which most all computer users are familiar. In particular, the automation system can allow a user to create automation instructions or automate a process by taking screenshots of graphical user interface elements and naming files containing the screenshots. Furthermore, the user can create the automation instructions while performing the operations that the user desires to automate. For example, the user can take screenshots and name files while actually performing the operations. Thus, if the user knows how to manually perform the operations, the user knows how to create instructions to automate the operations. As such, the process for creating the automation instructions can be simple and intuitive.

According to one or more embodiments, the automation system can allow users to generate automation instructions that include a plurality of operations to be performed in a sequence. For each operation, the user can create a data file (e.g., screenshot of a graphical user interface element) with a name indicating the desired operation. The user can then indicate a type and a priority of each operation in a plurality of operations. In particular, a user can indicate the operation type and priority for each operation in the name of each of the corresponding data files. For example, the user can indicate the operation type and priority for an operation using predetermined character strings in the name of the data file. Thus, the user can easily and quickly identify the operations and the order in which the operations are performed by leveraging the names of the data files.

Additionally, one or more embodiments of the automation system can determine a context for performing the operation based on the content of the data file. For example, the automation system can determine a location for performing the identified operation based on the content of a corresponding image file. To illustrate, the automation system can determine that the content of the image file (e.g., a screenshot) corresponds to a graphical user element in a graphical user interface where the automation system can perform the operation.

In one or more embodiments, the automation system can compare the content of each image file to a graphical user interface every time the automation system detects additional image files for operations to be automated. In particular, when the automation system performs an operation, the graphical user interface can update based on the type of operation and the location of the operation. When performing the next operation according to the priority of the automation instructions, the automation system can compare the content of the next image file to the updated graphical user interface to identify a location of a second graphical user interface element in the updated graphical user interface. Thus, the automation system can perform a series of sequential operations based on a plurality of data files even if each operation modifies the graphical user interface in some way.

Additionally, the automation system can monitor the graphical user interface to determine if the graphical user interface updates. For example, the automation system can continuously monitor the graphical user interface for graphical user interface elements that correspond to the content of an image file with an associated operation. If the graphical user interface updates to include the graphical user interface element corresponding to the image file, the automation system can detect the update and perform the operation associated with the image file.

Furthermore, the automation system can determine a context for an operation based on the content of a data file including text (e.g., a text file or a word processing document). Specifically, the automation system can determine a keystroke command to automate based on the content of a text file. For example, the automation system can identify, from an analysis of the text file, a logical location of a keystroke command corresponding to a user input of a keystroke on a keyboard. Thus, the automation system can automate keystroke commands in additional or alternative operation automation processes.

As used herein, the term "automating" or "automated" refers to performing user operations without requiring manual user input. Specifically, automating a user operation can include causing a computing device to perform a user operation that typically requires user input without input from the user. To illustrate, a user can create a set of instructions that when executed cause a computing device to perform a series of actions. The user can cause the computer device to start executing the set of instructions, after which the computing device can perform the series of actions automatically without further user input.

As used herein, the term "operation" refers to any type of user operation that a user can perform using an input device of a computing device. In particular, an operation can include any operation performed by any type of user input to a graphical user interface or device. For example, an operation can include a mouse operation, a keyboard operation (e.g., a keystroke command), a touch operation on a touchscreen, a movement operation using a gyroscope or other movement detector, or any operation in connection with a user input to a computing device. Thus, operations can comprise selecting graphical user interface elements (single click, double click, right click, etc.), moving elements (e.g., drag and drop), typing text, navigating a graphical user interface (scrolling, zooming, etc.), and other actions that a user can cause a computing device to perform.

As used herein, the term "graphical user interface element" refers to elements provided by a graphical user interface to offer a visual representation of information stored by a computing device. Examples of graphical user interface elements include windows, menus, toolbars, icons, controls, widgets, tabs, etc.

As used herein, the term "data file" refers to any electronic document having content that indicates a context for an operation to be automated. For example, a data file can include electronic documents with image, text, or other content that can indicate a context for a particular operation. To illustrate, a data file can include an image file (.jpg, .tif, .png, .gif, .psd, etc.) or a text file (.txt, .doc, .pdf, etc.). The image files can include screenshots of graphical user interface elements where an operation should be performed. The text files can include keys or keystrokes to be automated. Additionally or alternatively, a data file can include a folder or file structure element containing additional data files associated with one or more other operations.

FIG. 1 illustrates a schematic diagram of one embodiment of an automation system 100. The automation system 100 may include, but is not limited to, a user interface manager 102, a content manager 104, an operation manager 106, and a data storage manager 108. Each of the components of the automation system 100 can be in communication with one another using any suitable communication technologies. It will be recognized that although the components of the automation system 100 are shown to be separate in FIG. 1, any of the components may be combined into fewer components, such as into a single component, or divided into more components as may sere a particular implementation.

The components can comprise software, hardware, or both. For example, the components can comprise one or more instructions stored on a computer-readable storage medium and executable by processors of one or more computing devices (e.g., client devices and/or server devices). When executed by the one or more processors, the computer-executable instructions of the automation system 100 can cause the computing device(s) to perform the automation methods described herein. Alternatively, the components can comprise hardware, such as a special purpose processing device to perform a certain function or group of functions. Additionally or alternatively, the components can comprise a combination of computer-executable instructions and hardware.

Furthermore, the components of the automation system 100 may, for example, be implemented as a stand-alone application, as a module of an application, as a plug-in for applications including image processing applications, as a library function or functions that may be called by other applications such as image processing applications, and/or as a cloud-computing model. Thus, the components of the automation system 100 may be implemented as a stand-alone application, such as an application for execution on a desktop computer or a native application running on a tablet, mobile phone, or other client device that can provide content to a user.

As mentioned above, the automation system 100 can include a user interface manager 102. In one or more embodiments, the user interface manager 102 monitors a graphical user interface. For example, the user interface manager 102 can monitor the graphical user interface by monitoring content in the graphical user interface and user inputs associated with the graphical user interface to determine if and/or when the graphical user interface changes. To illustrate, the user interface manager 102 can detect when a user modifies to the graphical user interface by interacting with elements in the graphical user interface or by performing an operation within the graphical user interface.

The automation system 100 can also include a content manager 104 to analyze content corresponding to the graphical user interface and in association with automated processes. Specifically, the content manager 104 can identify operations and information based on data files identified by a user. For example, the content manager 104 can include a content analyzer 110 and a text analyzer 110 for identifying operations and context associated with the operations.

In one or more embodiments, the text analyzer 112 can identify one or more operations to be automated. For example, the text analyzer 112 can identify operations based on names of data files. To illustrate, the text analyzer 112 can parse the name of a data file to determine that the name of the data file contains a predetermined character string associated with a specific operation to be automated. The text analyzer 112 can use any type of parsing techniques to identify the operation from the name of the data file.

In one or more additional embodiments, the content analyzer 110 can determine a context for one or more operations to be automated. In particular, the content analyzer 110 can analyze content of a data file to determine a context (e.g., where and/or how) for performing a corresponding operation. For example, the content analyzer 110 can analyze the content of an image file and compare the content to an active graphical user interface to locate a position of a graphical user interface element within the graphical user interface that corresponds (e.g., matches) the content of the image file. The content analyzer 110 can use any type of image recognition techniques to determine whether the content of an image file corresponds to a graphical user interface element in the graphical user interface.

The automation system 100 can also include an operation manager 106 that causes a computing device to perform the operations identified by the text analyzer 112 in accordance with the context identified by the content analyzer 110. For example, the operation manager 106 can cause a computing device to perform one or more operations in an automated process in response to a user input to begin the process. After beginning the process, the operation manager 106 can cause the computing device to perform one or more of the operations in the automated process without additional user input.

As described above, the automation system 100 can include a data storage manager 108 to facilitate storage of information for the automation system 100. In particular data storage manager 108 can store information used by one or more of the components in the automation system 100 to facilitate the performance of various operations associated with automating one or more user operations. In one embodiment as shown in FIG. 1, the data storage manager 108 maintains data files 114 and an operation log 116. The data storage manager 108 may also store any additional or alternative information corresponding to the operation of the automation system 100. The data storage manager 108 can maintain additional or alternative data as may serve a particular implementation. The data storage manager 108 may communicate with any component within the automation system 100 to obtain or share information. In one embodiment, the data storage manager 108 includes one or more servers on which various types of data are stored. For example, the data storage manager 108 may include or may be implemented in a data storage environment.

In one or more embodiments, the data files 114 can include any electronic document or file that includes content representing a context for one or more operations. Specifically, as described above, the data files 114 can include image files 118, text files 120, and/or folders. For example, an image file 118 can include a representation (e.g., a screenshot) of a graphical user interface element in the graphical user interface. Similarly, a text file 120 can include a representation of a keystroke command (e.g., corresponding to a key on a keyboard). In an additional example, a folder can indicate information about an operation to be automated and/or additional image files 118, text files 120, and/or folders containing information about one or more operations.

According to one or more embodiments, the operation log 116 can include a description of an automated process. For example, the operation log 116 can include a description of each of the operations in the automated process to allow a user to verify that the automated process is performing correctly or to debug one or more of the operations in the automated process. To illustrate, the operation log 116 can include a description of each operation, a corresponding image file or text file (if applicable), and an indication that the operation was successful. The operation log 116 can include any information describing the operation to allow the user to verify an operation order of the automated process and whether each operation performed correctly.

Although the data storage manager 108 in FIG. 1 is described to include the data files 114 and an operation log 116, the data storage manager 108 can include additional or alternative information related to the automation system 100, as previously mentioned. Additionally, the data storage manager 108 can include information for other types of systems and processes. For example, the data storage manager 108 can manage a distributed storage space configured to interface with one or more systems in addition to the automation system 100, allowing the different systems to interact with one another.

As previously mentioned, the automation system 100 can identify an operation based on an image file. FIGS. 2A-2D illustrate a sequence of graphical user interfaces illustrating steps of creating automation instructions in accordance with one or more embodiments. Specifically, FIGS. 2A-2D illustrate a user creating automation instructions to cause the computing device to automatically select the "My Computer" icon. Although FIGS. 2A-2D show an automated process for a user operation in a particular graphical user interface 200, the automation system 100 can implement automated process for user operations in any type of graphical user device and/or in connection with any type of computing device. Additionally, while the graphical user interface 200 of FIGS. 2A-2D is depicted as having various graphical user interface elements, software applications, and user input types, the graphical user interface 200 can be configured to include any graphical user interface elements, software applications, and/or user input types.

In one or more embodiments, the graphical user interface 200 can include one or more graphical user interface elements. For example, the graphical user interface elements can represent links, icons, or other representations for applications, folders or other file structure elements, operating system features, widgets, or specific locations in the graphical user interface. To illustrate, the graphical user interface elements can be unique elements that are visibly distinguishable from each other, such that the content analyzer 110 can identify a specific graphical user interface element 202 using a graphical analysis of the graphical user interface 200.

Figure 2A:
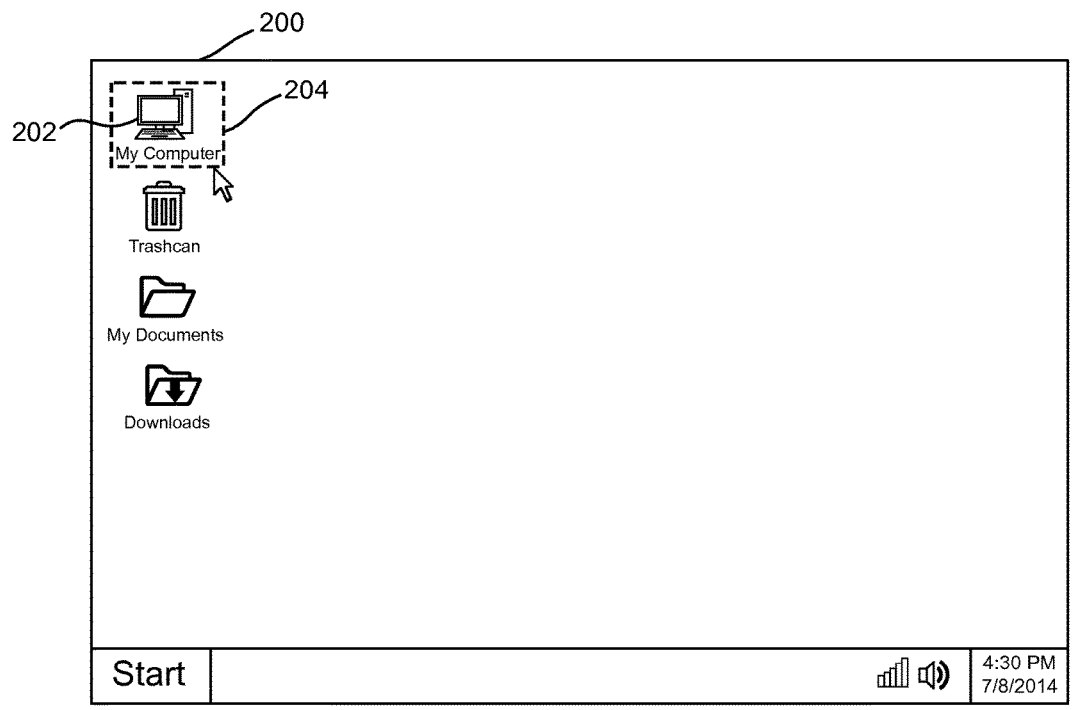
FIGS. 2A-2D illustrate a sequence of graphical user interfaces illustrating steps of creating automation instructions in accordance with one or more embodiments.

According to one or more embodiments, a user can create an image file 118a (shown in FIG. 2B) by capturing a screenshot of the graphical user interface element 202. Specifically, the user can capture a screenshot of a portion 204 of the graphical user interface 200 about the graphical user interface element 202 as shown in FIG. 2A. For example, if the user desires to create an automated process to select the graphical user interface element 202, the user can capture a screenshot of the graphical user interface element 202.

In one or more embodiments, the image file 118a can include sufficient visual information for the automation system 100 to identify a corresponding, unique location in the graphical user interface 200 where the automation system 100 can perform the associated operation. Specifically, the image file 118a can include a screenshot of the graphical user interface element 202 in the graphical user interface 200. In various examples, the image file 118a can include a screenshot of only the graphical user interface element 202, the graphical user interface element 202 and a portion of the graphical user interface 200 around the graphical user interface element 202, or the graphical user interface element 202 and at least a portion of one or more other graphical user interface elements in the graphical user interface 202.

Figure 2B:
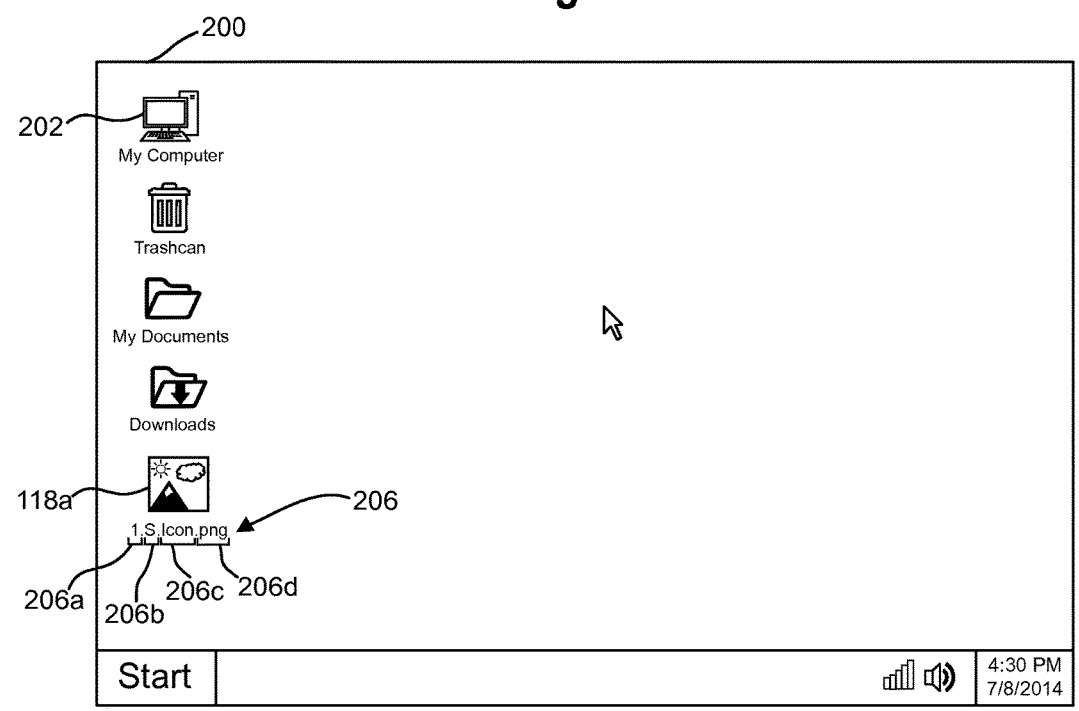

After generating the image file 118a, the user can store the image file 118a at a file location on the computing device for the automation system 100 to use while processing an automated process associated with the image file 118a. To illustrate, the user can store the image file at a desktop location in the graphical user interface 200, as shown in FIG. 2B. Alternatively, the user can store the image file 118a at any file location on the computing device where the automation system 100 can access the image file 118a.

When storing the image file on the computing device, the user can name the image file 118a according to a naming convention associated with the automation system 100. Specifically, the image file 118a can include identification information for an operation to be performed in association with the graphical user interface element 202 corresponding to the content of the image file 118a. For example, the image file 118a can include a predetermined character string corresponding to an operation type recognized by the automation system 100. To illustrate, the user can name the image file 118a with a filename 206 consisting of "1.S.Icon.png." The inclusion of the ".S." in the filename 206 can indicate that the user desires the automation system 100 perform a single-click on the graphical user interface element 202 corresponding to the content of the image file 118a.

In one or more additional or alternative embodiments, the user can add additional information about the operation to the name of the image file 118a. For example, the name of the image file 118a can include an order or priority of the operation. Specifically, the filename 206 of the image file 118a can include a predetermined character string indicating an order for performing the operation associated with the image file 118a relative to other operations in an automated process. As shown in FIG. 2B, the image file 118a has a priority of "1", indicating that an automated process associated with the "My Computer" graphical user interface element 202 begins with the single-click operation at the corresponding location.

According to one or more embodiments, the filename 206 of the image file 118a can include identification information that allows the user to easily identify the image file 118a. In particular, the filename 206 of the image file 118a can include an identifying string (e.g., "Icon" in FIG. 2B) selected by the user so the user can easily and correctly identify the image file 118a. To illustrate, the identifying string can allow the user to easily distinguish the image file 118a from image files with similar content or operation information. For example, if the user creates two image files associated with separate single-click operations for different locations in the graphical user interface, the user can provide a unique identifying string for each image file so the user can easily distinguish the image files.

Figure 2C:
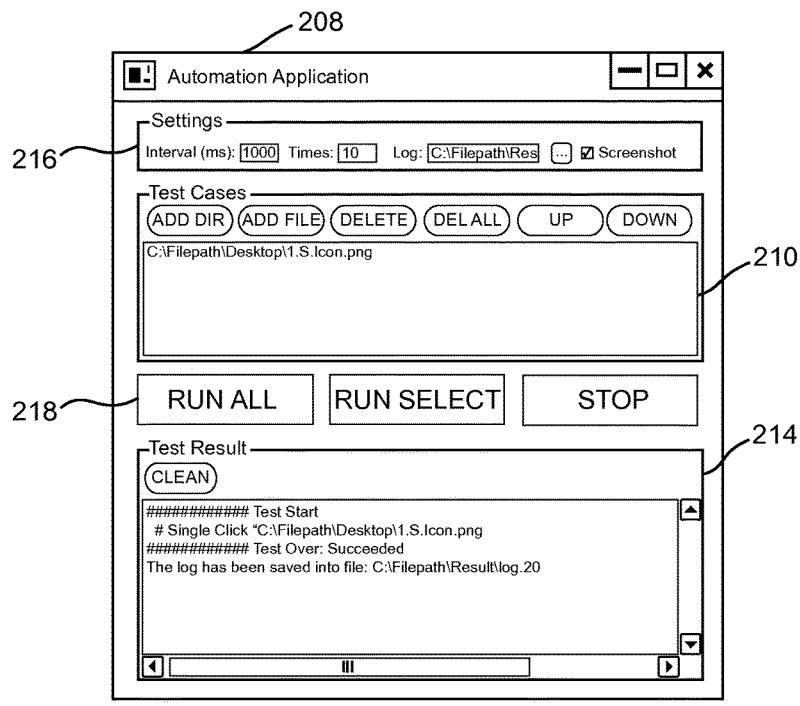

After generating the image file 118a, the user can use the automation system 100 to test and/or run the automated process for the operation associated with the image file 118a. For example, the user can use the automation user interface 208 associated with the automation system 100 to run the automated process, as shown in FIG. 2C. In particular, the automation user interface 208 can form part of an application or a software plugin that allows the user to input one or more data files for a particular automated process. The automation system 100 can then run the automated process using the indicated data files.

For example, the user can input one or more data files to the automation user interface 208 for automating one or more operations associated with the one or more data files. To illustrate, the user can input the image file 118a shown in FIG. 2B into an operation list 210. For example, the user can select the image file 118a as an input to the automation user interface 208 for running the automated process. In additional or alternative examples, the user can select a folder containing the image file 118a as an input to the automation user interface 208.

As described above, the automation system 100 can determine which operations to perform and in which order to perform the operations based on the names of the indicated data files. In one or more embodiments, the automation system 100 can determine different pieces of information associated with the automated process based on a position of the pieces of information in the names of the data files. Specifically, the automation system 100 can designate specific positions indicating a priority or order, a type, an identifying string, and (if applicable) a file extension. For example, the naming convention dictated by the automation system 100 can designate an order or priority portion 206a, an operation type portion 206b, an identifying string portion 206c, and a file extension (e.g., indicating an image file or a text file) portion 206d. As shown the order or priority portion 206a can be located at the start of the filename (i.e., in a first position), the operation type portion 206b can be located in a second position, the identifying string portion 206c can be in a third position, and the file extension (e.g., indicating an image file or a text file) portion 206d can be in a fourth position. In additional or alternative implementations, the automation system 100 can designate different positions in the name for the information described above, or to other types of information that may be useful for identifying operations in an automated process. In particular, in alternative embodiments the naming convention can include the identifying string portion 206c in the first position, the operation type portion 206b in the second position, and the order portion 206a in the third position. In still further embodiments, the portions 206a-c can be arranged in yet further orders.

According to one or more embodiments, the automation system 100 can use any type of method of identifying the different portions 206a-206d of the filename 206 of the image file 118a. In particular, the automation system 100 can detect a separator character in the name of the image file to identify when a order portion 206a ends and a operation portion 206b starts. For example, the separator character can include a single character (e.g., ".") that the user may insert between pieces of information so that the automation system 100 may identify the separate positions. In additional or alternative embodiments, the separator character may be a different character than described herein, or may be a combination of characters.

In additional or alternative embodiments, the automation system 100 can identify the different portions 206a-206d based on a character position within the name of the image file 118a. For example, the automation system 100 may specify that each portion include or be defined by a predetermined number of character spaces. Specifically, each portion 206a-206d may use a number of characters in the filename 206 of the image file 118a for indicating the corresponding information. To illustrate, one or more of the priority of the operation, the type of the operation, and the identifying string can have predetermined numbers of characters and positions in the name of the image file 118a. Thus, the automation system 100 may identify one or more pieces of information by counting characters from the beginning (or the end) of the filename 206 of the image file 118a.

Figure 2D:
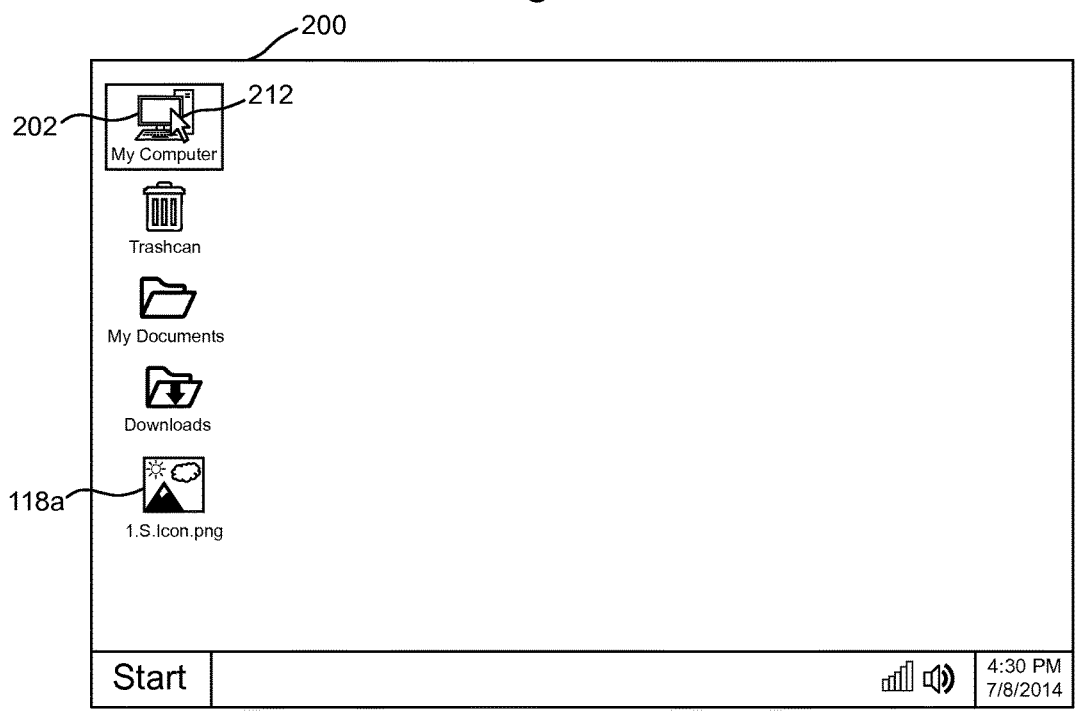

As previously described, the automation user interface 208 can allow the user to test the automated process. For example, the user can test the automated process by running a test case of the automated process using the automation user interface 208. To illustrate, the user can test the process by selecting an option 218 to automate the step identified by the files added to the operations list 210. As shown in FIG. 2D, upon selecting the run option 218, the computing device can automate the operation associated with the image file 118a. In particular, the automation system 100 can identify the file in the operations list 210 with the first priority. In the illustrated case, the automation system 100 can identify the "1.S.Icon.png" file as the first file to be analyzed based on the "1" in the priority portion 206a (or alternatively as being the only file in the operations list 210). The automation system 100 can then determine the operation to be performed by analyzing the characters of the title of the image file 118a in the operation portion 206b. Specifically, the automation system 100 can determine that the operation to be automated is a single click based on an "s" being in the operation portion 206b. At this point or even before, the automation system 100 can determine where to perform the identified operation. Specifically, the automation system 100 can detect or analyze the content of the image file 118a and then use an image-matching algorithm to detect a portion of the currently active graphical user interface 200 that matches the content of the image file 118a.

Upon detecting that the "My Computer" icon 202 matches the content of the image file 118a, the automation system 100 can move the cursor 212 to the "My Computer" graphical user interface element 202 within the graphical user interface 200. The automation system 100 can then perform a single-click mouse operation on the graphical user interface element 202 causing the "My Computer" graphical user interface element 202 to be selected as shown by FIG. 2D.

As mentioned, the automation system 100 can compare the screenshot in the image file 118a to the graphical user interface 200 to determine the location of the graphical user interface element 202 (if present) in the graphical user interface 200. In one or more implementations, the automation system 100 can compare each pixel in the image file 118a to the graphical user interface 200 to determine whether there is an exact match between the content of the image file 118a and the graphical user interface 200. Thus, the automation system 100 can even distinguish between a graphical user interface element 202 in a first state and the same graphical user interface element 202 in a second state. For example, the automation system 100 can distinguish between an icon (e.g., a minimize button) in an application window that is currently in focus and the same icon in an application window that is not currently in focus.

According to one or more embodiments, the automation system 100 can determine a location in the graphical user interface 200 to perform the operation associated with the image file by analyzing the content of the image file 118a. Specifically, because the image file 118a can include a screenshot of the graphical user interface element 202, the automation system 100 can determine a location (e.g., pixel coordinates) in the graphical user interface 202 by comparing a specific pixel or set of pixels in the content of the image file 118a to the graphical user interface 200. For example, the automation system 100 can determine the location based on a center pixel (or center pixels) of the content of the image file 118a. In alternative examples, the automation system 100 can determine the location based on a pixel or a group of pixels other than the center pixel(s), such as a corner pixel or specific edge pixel of the content of the image file 118a. In other implementations, the automation system 100 can select any location in connection with an identified graphical user interface element 202 from the content of the image file 118a.

More specifically, the automation system 100 can initially compare a subset of the pixels of the screenshot of the image file 118a to an image of the graphical user interface 200. Initially comparing only a subset of the pixels of the screenshot of the image file 118a can allow the automation system 100 to quickly scan and determine if the graphical user interface 200 includes a potential match. If the automation system 100 identifies a plurality of areas of the graphical user interface 200 that match the subset of pixels, the automation system 100 can compare a larger subset of pixels or all of the pixels of the screenshot to the areas that matched the subset to verify if the potential matches are actual matches.

If the automation system 100 cannot find the graphical user interface element 202 in the graphical user interface, the automation system 100 can fail the operation. Specifically, when the automation system 100 fails the operation, the automation system 100 can stop the automated process and notify the user that the operation failed. Additionally or alternatively, the user can manually stop the automated process if the automation system 100 is not responding.

The automation system 100 may be able to retrace the steps in the automated process to modify the graphical user interface 200 if an operation in the automated process fails. In one or more embodiments, the automation system 100 may revert the graphical user interface 200 back to a previous state. In alternative embodiments, the automation system 100 may leave the graphical user interface 200 in a state according to the most recently performed operation.

The automation user interface 208 can also provide useful testing/debugging information in response to running the test case of the automated process. In particular, the automation user interface 208 can include a results field 214 that shows the progress of the automated process while running. For instance, for the image file 118a of FIG. 2B, the results field 214 can show the single-click operation and the corresponding image file 118a with the screenshot of the "My Documents" graphical user interface element 202. The results field 214 can also show additional information that is relevant to the automated process, including a start and end of the process and whether each operation was successful.

The automation user interface 208 may also allow a user to configure certain settings 216 of an automated process for testing the process. Specifically, the automation user interface 208 may include options for modifying timing associated with the process (e.g., a time delay between each operation) to verify that the automation system 100 correctly performs each operation. In some instances, the automation user interface 208 can allow a user to save an operation log and/or screenshots from the automated process, as described in more detail below.

In one or more embodiments, the automation system 100 can also allow the user to generate a script based on the indicated data files. For instance, the user can input a plurality of data files associated with one or more operations into the automation user interface 208 and generate a script for the one or more operations. The user can then perform the one or more operations by running (e.g., selecting) the script at any time after generating the script. The script can perform the automated process upon selection by the user, and without additional input from the user.

As described above, the automation system 100 can allow a user to input a plurality of data files into automation user interface 208 for performing an automated process including a series of operations corresponding to the plurality of data files. FIGS. 3A-3D illustrate another sequence of graphical user interfaces illustrating steps of creating automation instructions in accordance with one or more embodiments. Specifically, FIGS. 3A-3D illustrate a user creating automation instructions to cause the computing device to create and name a new folder.

Because creating and naming a new folder can include a plurality of user operations, the automation system 100 can identify each of the operations in association with a separate data file. Specifically the user can create a plurality of data files having names and content that indicates the operations and context for the operations, respectively. To illustrate, the user can create a data file for each operation to be automated in the automated process, as described below.

Figure 3A:
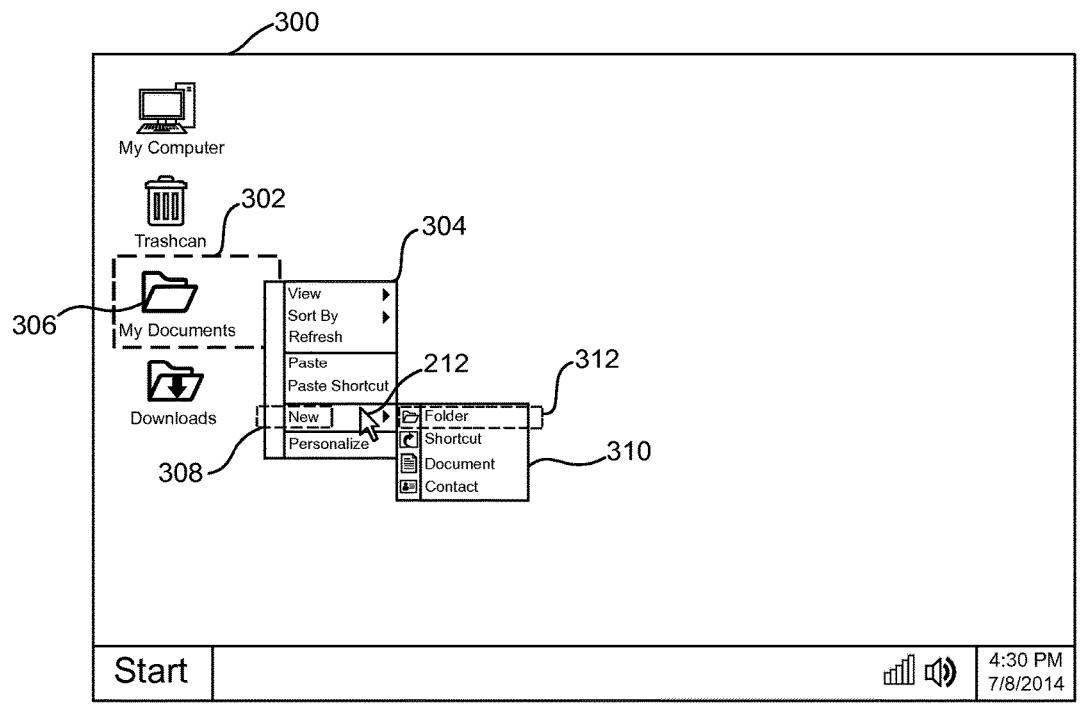
FIGS. 3A-3D illustrate another sequence of graphical user interfaces illustrating steps of creating automation instructions in accordance with one or more embodiments.

For example, creating a new folder in a graphical user interface 300 can include a right-clicking on a portion of the graphical user interface 300 to open a dropdown menu 304, as shown in FIG. 3A. The user can create a first data file associated with the right-click operation by capturing a screenshot of a specific location 302 on the graphical user interface 300. Specifically, the screenshot can be at any location in the graphical user interface 300 that allows the automation system 100 to distinguish the location 302 from other areas in the graphical user interface 300. To illustrate, the user can capture a screenshot of a location near or including a graphical user interface element 306, or of a unique portion of a background image. The user can name the first data file 118b (see FIG. 3D) according to the designated naming convention for a right-click operation with a first priority (e.g., "1.r.png").

The naming convention described above in relation to FIG. 2B included four portions. One will appreciate that in alternative embodiments the naming convention can include less than four portions or include more than four portions. For example, as shown by the name of the image file 118b, the name can omit the identifying portion. Thus, the user can have the option to include an identifying portion or not.

In the embodiment of FIG. 3A, creating a new folder in the graphical user interface 300 also can include moving a cursor 212 over a "New" option 308 in the dropdown menu 304 to open a second dropdown menu 310. The user can create a second data file associated with the cursor movement operation by capturing a screenshot of a location of the "New" option 308. Specifically, the screenshot can include at least a portion of the "New" option 308 in the dropdown menu that allows the automation system 100 to accurately distinguish the location from other areas in the graphical user interface 300. The user can name the second data file 118c to indicate that the user desires the system 100 to automatically move the cursor over the "New" option 308. Specifically, the user can name the data file 118c "2.m.png" to signify it is the second operation (signaled by the "2" in the order portion 206a) and involves moving to the area of the graphical user interface 300 matching the content of the file (signaled by the "m" in the operation portion 206b).

The automated process can also include a single-click operation to select a "Folder" option 312 in the second dropdown menu 310. The user can create a third data file 118d associated with the single-click operation by capturing a screenshot of the "Folder" option 312. In particular, the screenshot can include at least a portion of the "Folder" option 312 in the second dropdown menu 310 that allows the automation system 100 to accurately distinguish the location from other areas in the graphical user interface 300. The user can name the third data file 118d with "3.s.png" to signify it is the third operation (signaled by the "3" in the order portion 206a) and involves a single click on the area of the graphical user interface 300 matching the content of the file (signaled by the "s" in the operation portion 206b).

Figure 3B:
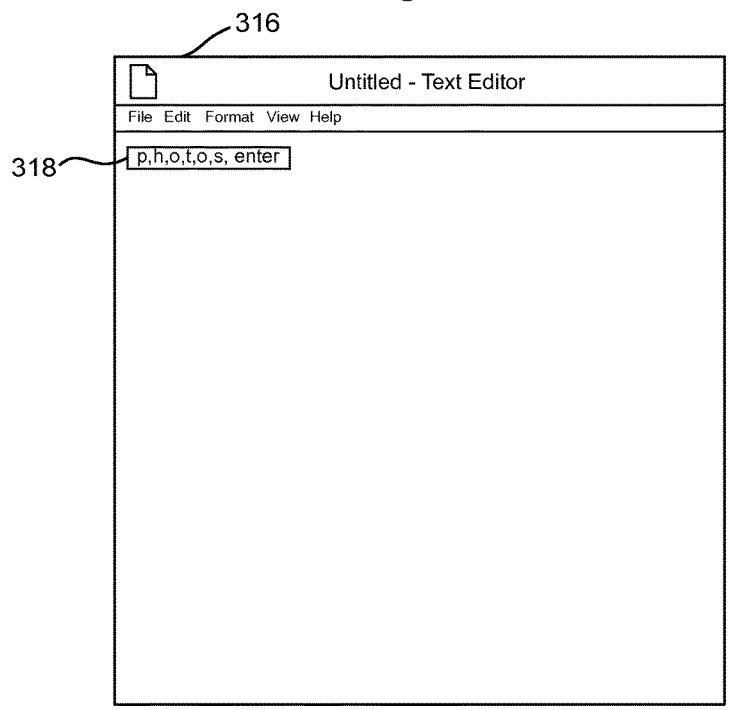

In one or more embodiments, selecting the "Folder" option 312 can create a new folder. Typically, upon creating a new folder, the graphical user interface 300 can prompt the user to enter a name of the new folder, for example, by highlighting a current name of the folder and allowing the user to enter a new name by pressing keys on a keyboard. To automate this process, the user can create a fourth data file 120a associated with the keyboard operation to enter a name of the new folder by creating a text file 316 with text for the name, as shown in FIG. 3B. Specifically, the text file 316 can include a plurality of keystroke commands for causing the automation system 100 to execute specific keystrokes.

For example, the text file can include comma-separated values of characters mapped to specific keystroke commands. To illustrate, a comma can separate each character or character string mapped to a particular keystroke command. The text file of FIG. 3B includes the text "p, h, o, t, o, s, enter" 318, which indicates to the automation system 100 to enter "photos" as the new folder name, followed by a keystroke command to execute an "enter" keystroke to complete the naming of the new folder.

Figure 3C:
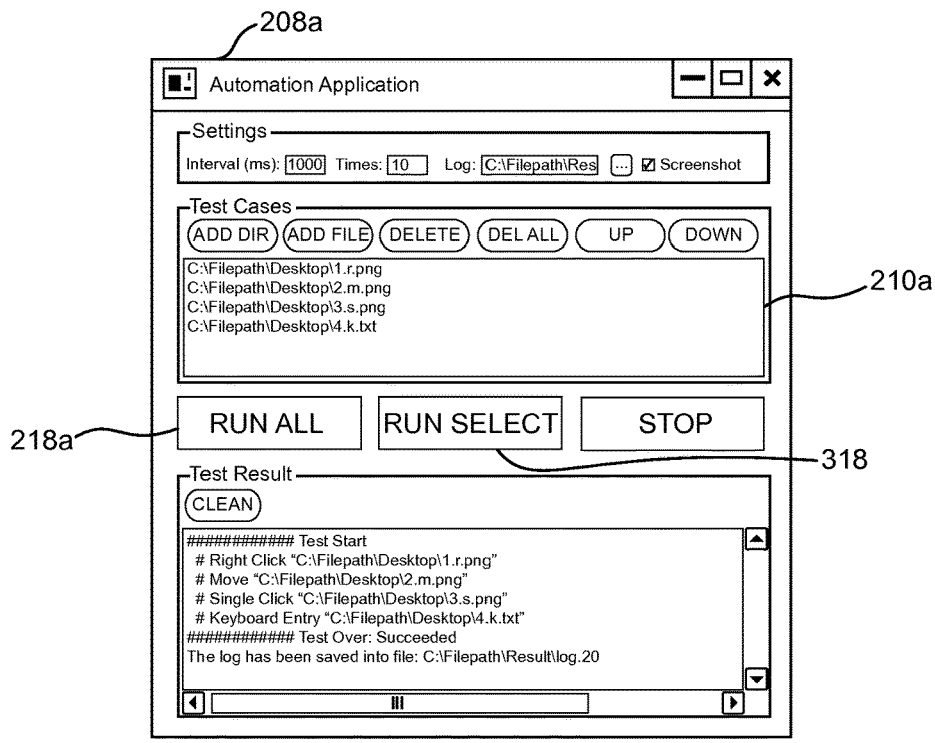

After generating each of the data files (118b-118d, 120a) associated with the operations for creating and naming a new folder in the graphical user interface, the user can add the data files (118b-118d, 120a) to the operations list 210a of an automation user interface 208a. FIG. 3C shows the automation user interface 208a for running the operations for creating and naming the new folder. To illustrate, the user can input each of the data files associated with the operations to be automated into the automation user interface 208a. Specifically, the user can drag and drop graphical user interface elements shown in FIG. 3D that represent the data files (118b-118d, 120a) into the operations list 210a. Alternatively, the user can type in the file paths for the data files (118b-118d, 120a).

As described previously, the automation system 100 can detect the order in which to process the operations based on the priority of the data files (118b-118d, 120a), as determined from the name of each data file. For example, the automation system 100 can perform the operations according to a priority identified by a numerical order (e.g., "1, 2, 3, 4 . . . ") identified in the names of the data files. Specifically, the automation system 100 can identify the number in the order position 206a of each filename to determine the order in which to process the data files (118b-118d, 120a). To illustrate, in the embodiment of FIG. 3C, the automation system 100 can perform a right-click operation first, a move operation second, a single-click operation third, and one or more keystroke commands fourth. In alternative embodiments, the naming convention can optionally omit an order portion 206a. In such embodiments the automations system 100 can determine an order to process the data files (118b-118d, 120a) based on the order in which the data files (118b-118d, 120a) are arranged or added to the operations list 210a.

In one or more embodiments, the automation interface 208a can allow a user to test selected operations in the automated process. For example, the automation interface 208a can allow a user to select one or more data files in an operations list 218a and select the "run select" option 318. Specifically, the user can select one or more data files and the automation system can attempt to perform the operations associated with the selected data files. Testing one or a selected few data files may allow the user to test an automated process on a micro-level, rather than having to test the automated process as a whole.

Upon selecting the run option 218a, the computing device can automate the operation associated with the data files in the operations list 210a. In particular, the automation system 100 can identify the file in the operations list 210a with the first priority. In the illustrated case, the automation system 100 can identify the "1.r.png" file 118b as the first file to be analyzed based on the "1" in the priority portion 206a. The automation system 100 can then determine the operation to be performed by analyzing the characters of the title of the image file 118b in the operation portion 206b. Specifically, the automation system 100 can determine that the operation to be automated is a right click based on an "r" being in the operation portion 206b. At this point or even before, the automation system 100 can determine where to perform the identified operation. Specifically, the automation system 100 can detect or analyze the content of the image file 118b and then use an image-matching algorithm to detect a portion of the currently active graphical user interface 300 that matches the content of the image file 118b. Upon detecting that the space of the graphical user interface 300 next to the "My Document" icon 306 matches the content of the image file 118b, the automation system 100 can move the cursor to this area of the graphical user interface 300 and then perform a right-click operation causing the drop-down menu 304 to open.

Next the automation system 100 can identify the file in the operations list 210a with the second priority. In the illustrated case, the automation system 100 can identify the "2.m.png" file 118b as the second file to be analyzed based on the "2" in the priority portion 206a. The automation system 100 can then determine the operation to be performed by analyzing the characters of the title of the image file 118c in the operation portion 206b. Specifically, the automation system 100 can determine that the operation to be automated is a move operation based on an "m" being in the operation portion 206b. At this point or even before, the automation system 100 can determine where to perform the identified operation. Specifically, the automation system 100 can detect or analyze the content of the image file 118c and then use an image-matching algorithm to detect a portion of the currently active graphical user interface 300 that matches the content of the image file 118c (note that the graphical user interface 300 will have changed from when the first operation was performed by opening the drop-down menu 304). Upon detecting that the "new" option 308 of the graphical user interface 300 matches the content of the image file 118c, the automation system 100 can move the cursor to this area of the graphical user interface 300.

After finishing the automation of the second operation, the automation system 100 can identify the file in the operations list 210a with the third priority. In the illustrated case, the automation system 100 can identify the "3.s.png" file 118d as the third file to be analyzed based on the "3" in the priority portion 206a. The automation system 100 can then determine the operation to be performed by analyzing the characters of the title of the image file 118d in the operation portion 206b. Specifically, the automation system 100 can determine that the operation to be automated is a single click operation based on an "s" being in the operation portion 206b. At this point or even before, the automation system 100 can determine where to perform the identified operation. Specifically, the automation system 100 can detect or analyze the content of the image file 118d and then use an image-matching algorithm to detect a portion of the currently active graphical user interface 300 that matches the content of the image file 118d (note that the graphical user interface 300 will have changed from when the second operation was performed by opening the drop-down menu 310). Upon detecting that the "folder" option 312 of the graphical user interface 300 matches the content of the image file 118d, the automation system 100 can move the cursor to this area of the graphical user interface 300 and perform a click on the "folder" option 312.

At this point, the automation system 100 can identify the file in the operations list 210a with the fourth priority. In the illustrated case, the automation system 100 can identify the "4.k.txt" file 120a as the fourth file to be analyzed based on the "4" in the priority portion 206a. The automation system 100 can then determine the operation to be performed by analyzing the characters of the title of the text file 120a in the operation portion 206b. Specifically, the automation system 100 can determine that the operation to be automated is one or more keyboard operations based on a "k" being in the operation portion 206b. At this point or even before, the automation system 100 can analyze the content of the text file 120a to determine the context/scope of the keyboard operation(s) to be performed. Specifically, the automation system 100 can detect that the content of the text file 120a is "p, h, o, t, o, s, enter" and in response can automatically execute in sequence the "p" key, "h" key, "o" key, "t" key, "o" key, "s" key, and the "enter" key.

Figure 3D:
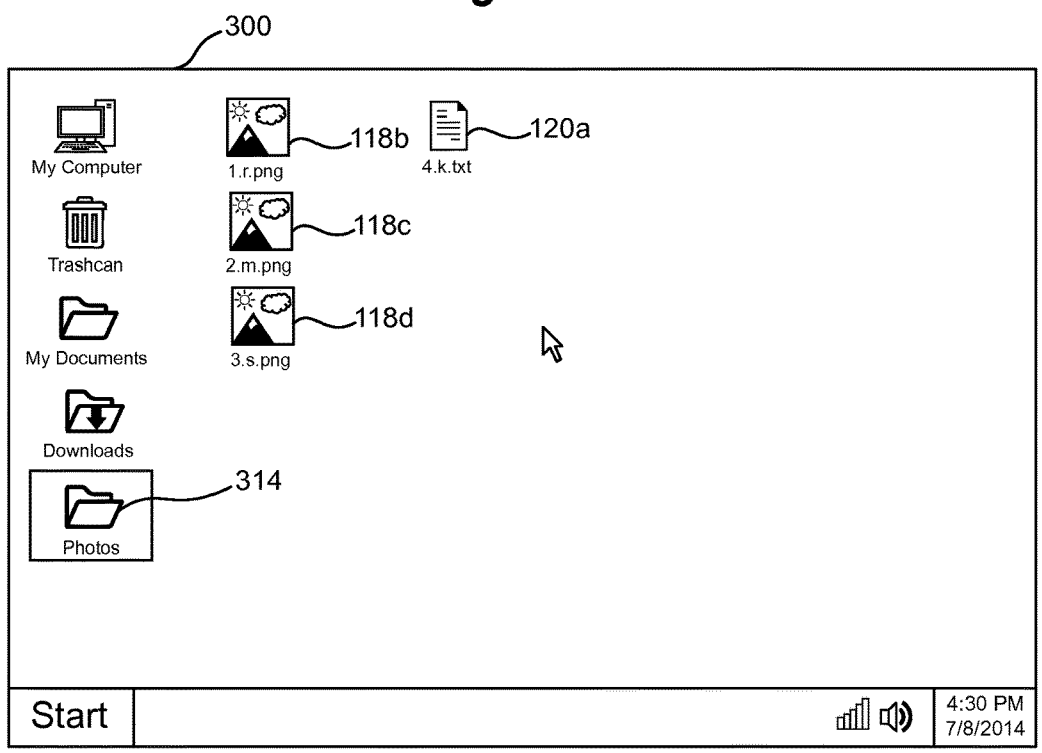

FIG. 3D illustrates a result of the automated process associated with FIGS. 3A-3C. As shown, the automation system 100 can create and name the new folder "photo" 314 based on a plurality of operations associated with a plurality of data files. Although the automation system 100 of FIGS. 3A-3D is described as performing a plurality of operations for creating a new folder 314, the automation system 100 can run an automated process for any number of operations based on data files created by the user.

As described above, the automation system 100 can generate an operation log with the results of an automated process. FIG. 4 shows an operation log 116a for the automated process of FIGS. 3A-3D. Specifically, the operation log 116a includes each step in an automated process for creating and naming the new folder 314 in the graphical user interface 300. Although FIG. 4 shows an operation log 116a for creating and naming the new folder 314, the automation system 100 can generate an operation log 116a for any automated process including any number of steps.

In one or more embodiments, the operation log 116a can include a table of information about the automated process. Each column in the table can describe or show information corresponding to one or more aspects of an operation in the automated process. For example, the operation log 116a can include a time column 402, a message column 404, a result column 406, and a file column 408.

According to one or more embodiments, the time column 402 can include information about a time of each operation. Specifically, the time column 402 can include a timestamp for the time at which the automation system 100 attempted to complete each operation. For example, the timestamp can include a date and time of each attempt to allow a user to easily identify when the automation system 100 attempted each operation.

In one or more embodiments, the message column 404 can show a description of each operation. For example, the message column 404 can include a description of each operation in natural language so that the user is able to verify that the automation system 100 attempted the correct operation. Additionally or alternatively, the message column 404 can include the file path for the data file corresponding to the operation so that the user is able to verify that the data file is named correctly and that the automation system 100 is using the correct data file.

In one or more embodiments, the result column 406 can include information about a result of each operation. Specifically, the result column 406 can include a message indicating whether the automation system 100 successfully located the graphical user interface element associated with a particular operation. Additionally or alternatively, the result column 406 can include information about a location at which the automation system 100 performed the operation in the graphical user interface 300. For example, the result column 406 can include a grid location of a pixel at which the automation system 100 performed the corresponding operation.

According to one or more embodiments, the file column 408 can include the content of image files associated with the automated process. In particular, the file column 408 can include image files containing screenshots of locations in the graphical user interface. For example, the screenshots can include graphical user interface elements or other unique locations in the graphical user interface 300 that allow the automation system 100 to identify locations for performing the corresponding operations. Showing the screenshot for the operation can allow the user to verify that the corresponding image file contained the screenshot for the correct location in the graphical user interface 300.

In additional or alternative embodiments, the operation log 116a can include other information not shown in FIG. 4. For example, the operation log 116a can include a screenshot of the graphical user interface 300 that the automation system 100 used to compare to an image file for a corresponding operation. Specifically, the screenshot of the graphical user interface 400 can include a screenshot of the whole graphical user interface 300 at the time the automation system 100 attempted to match the content of the image file to a location in the graphical user interface 300.

In one or more embodiments, the operation log 116a can include at least one entry (e.g., row) for each operation in the automated process. Specifically, the operation log 116a can include an entry for each operation associated with an image file, and one or more entries for each operation associated with a text file. For example, when executing keystroke commands associated with a text file, the operation log 116a can include an entry indicating that the automation system 100 began an operation to enter keystroke commands from a specified text file. The operation log 116a can also include entries for each keystroke command associated with the text file (e.g., an entry for each of the characters or character strings mapped to a keystroke command and included in the text file). Additionally, the operation log 116a can include an entry indicating that the automation system 100 completed entry of the keystroke commands associated with the text file.

In one or more embodiments, the operation log 116a can also include entries indicating other general information about the automated process. For example, entries including information about the beginning and end of the automated process can allow the user to verify the total time associated with the automated process, which may be useful in debugging the automated process if the automation system 100 did not successfully complete all of the operations. Additionally or alternatively, the operation log 116a can include an entry indicating a storage location of the operation log 116a, allowing the user to verify that the automation system 100 fully completed the operation log 116a.

FIGS. 2A-4 illustrate several mouse and keyboard operations that the automation system 100 can automate. As described above, a predetermined character string can map to a particular user action. For example, as discussed above, an "s" in the operation position 206b can map to a single click operation. In order to aid the user in naming files according to a desired operation to be automated, the automation system 100 can map a plurality of predetermined characters strings to a single operation to be automated. For example, when the automation system 100 detects any of "s," "singleclick", "sclick," "click," "sc," in the operation position of a filename, the automation system 100 can automate a single click. Thus, the automation system can allow a user to enter any number of a plurality of different strings in the operation position to signify a single operation. As such, the user may not have to know or memorize a certain set of commands but rather can intuitively enter a command/character string into the operation position of a filename to signal the operation that the user desire the automation system to automate.

FIG. 5 illustrates a table diagram 500 of a set of user operations for automating. The mouse/touch operations and the keyboard operations in the table diagram 500 of FIG. 5 can include the common user operations for automating. For example, FIG. 5 illustrates the naming conventions to perform the operations of a single click, a double click, a right click, a selection, a drag and drop, a keyboard entry, and a keep key (i.e., holding down a key such as "shift). Although FIG. 5 shows a set of user operations corresponding to mouse/touch and keyboard user operations, the automation system 100 can automate a plurality of additional or alternative operations, including flow control or variable operations, as shown in the table below.

| Operation | File/Folder Format | Example |
|---|---|---|
| Single Click | ./order.S[.description].png | ./8.S.ok.png |
| Double Click | ./order.D[.description].png | ./3.D.png |
| Right Click | ./order.R[.description].png | ./3.R.icon.png |
| Selection | ./order.Select[.description].png | ./3.Select.png |
| Mouse Move | ./order.M[.description].png | ./3.M.png |
| Drag and Drop | ./order.Dragdrop[.description]/drag.png | ./9.dragdrop/drag.png |
|  | ./order.Dragdrop[.description]/drop.png | ./9.dragdrop/drop.png |
| Mouse Wheel | ./order.Wheel[.description].txt | ./3.Wheel.txt |
| Keyboard Entry | ./order.K[.description].txt | ./4.K.txt |
| Keep Key | ./order.Keep[.description]/key.txt | ./3.keep/key.txt |
|  | ./order.Keep[.description]/operation/ | ./3.keep/operation/ |
| Delay Automation | ./order.delay[.description].txt | ./2.delay.txt |
| Text input | ./order.T[.description].txt | ./5.T.txt |
| Command Execution | ./order.P[.description].txt | ./2.P.txt |
| Javascript | ./order.script[.description].js | ./2.script.demo.js |
| Find Expected Image | ./order.Expect[.description].png | ./9.Expect.png |
| Find Expected Clipboard | ./order.Expect[.description].txt | ./3.Expect.txt |
| Variable Assignment | ./$name=[test file without priority] | ./$abc=s.mydoc.png |
| Use Variable | ./order.$name | ./9.$abc |
| IF | ./order.IF[.description]/condition/ | ./9.IF/condition/ |
|  | ./order.IF[.description]/true/ | ./9.IF/true/ |
|  | ./order.IF[.description]/false/ | ./9.IF/false/ |
| WHILE | ./order.WHILE[.description]/condition/ | ./9.WHILE/condition/ |
|  | ./order.WHILE[.description]/loop/ | ./9.WHILE/loop/ |
| UNLESS | ./order.UNLESS[.description/condition | ./9.UNLESS/condition/ |
|  | ./order.UNLESS[.description]/loop/ | ./9.UNLESS/loop/ |
| FOREACH | ./order.FOREACH[.description]/list/ | ./9.FOREACH/list/ |
|  | ./order.FOREACH[.description]/loop/ | ./9.FOREACH/loop/ |
| EXCEPTION | ./order.EXCEPTION[.description]/try/ | ./5.EXCEPTION/try/ |
|  | ./order.EXCEPTION[.description]/catch/ | ./5.EXCEPTION/catch/ |
|  | ./order.EXCEPTION[.description]/finally/ | ./5.EXCEPTION/finally/ |

| Operation | File/Folder Format | Example |
|---|---|---|
| Include | ./order.Include[.description].txt | ./4.include.txt |
| Subdirectory | ./order.B[.description]/ | ./9.B/ |

In one or more embodiments, the automation system 100 can determine whether each of the operations succeeds or fails based on the type of operation. For example, for an operation based on an image file (e.g., single click, double click, right click, selection, or drag and drop), the operation fails if the automation system 100 does not find the image in a predetermined amount of time (e.g., as configured in the automation user interface 208). In additional or alternative embodiments, the automation system 100 can always pass certain operations. For example, the automation system 100 can always pass mouse wheel operations or keystroke command operations.

According to some embodiments, some of the operations listed in the table above may not perform a user operation, but may cause the automation system 100 to behave in a certain way. For example, the "Find Expected Image" operation can check whether the automation system 100 finds content from an image file in a graphical user interface. The automation system 100 can perform another operation based on a success or failure of the "Find Expected Image" operation. The "Find Expected Image" operation can also allow the automation system 100 to perform operations in a graphical user interface in response to a notification or other modification in the graphical user interface, and without receiving input from a user to begin an automated process.

In one or more embodiments, the automation system 100 can stop the automated process if an operation fails. Specifically, the automation system 100 can detect when an operation fails and stop the automated process before attempting to process any additional operations after the failed operation. The automation system 100 can store an entry indicating the failed operation in the operation log for the user to using in debugging the automated process.

The automation system 100 can also allow a user to assign a test file as a variable. For example, the user can assign the test file as a variable, which does not cause the automation system 100 to perform any user operations. The user can then cause the automation system 100 to invoke an operation based solely on the name of the test file regardless of the content of the test file.

As shown in the table above, the automation system 100 may allow a user to perform flow control operations. Specifically, the flow control operations allow a user to perform conditional operations, loops, and/or other operations that can determine how the automation system 100 performs one or more other operations based on the content of corresponding data files and a current status/view of a graphical user interface.

In one or more implementations, the automation system 100 can also determine an operation to perform by testing a plurality of data files. Specifically, each of the data files can indicate the same priority and operation type in the to the automation system 100. The data files can also include a different identifying string to allow the automation system 100 to distinguish the data files from each other. In one example, the automation system 100 can attempt to process each data file in an order determined by the file structure until one of the data files passes. The automation system 100 can then skip each of the other data files after successfully performing an operation associated with one of the data files.

FIGS. 1-5, the corresponding text, and the examples, provide a number of different systems and devices for automating user operations. In addition to the foregoing, one or more embodiments can be described in terms of flowcharts comprising acts and steps in a method for accomplishing a particular result. For example, FIGS. 6 and 7 illustrate flowcharts of exemplary methods in accordance with one or more embodiments.

Figure 6:
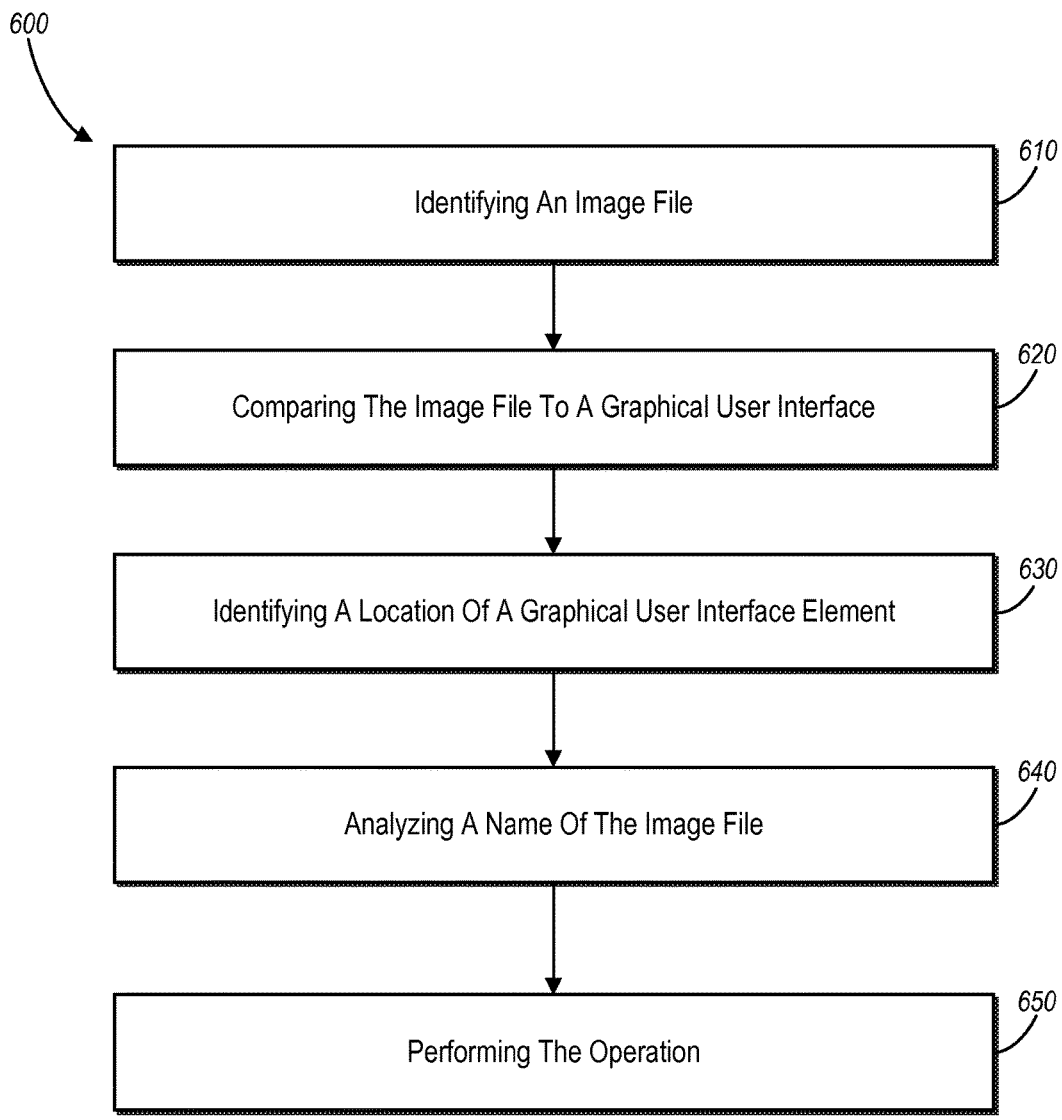
FIG. 6 illustrates a flowchart of a series of acts in a method of automating user operations in accordance with one or more embodiments.
Figure 7:
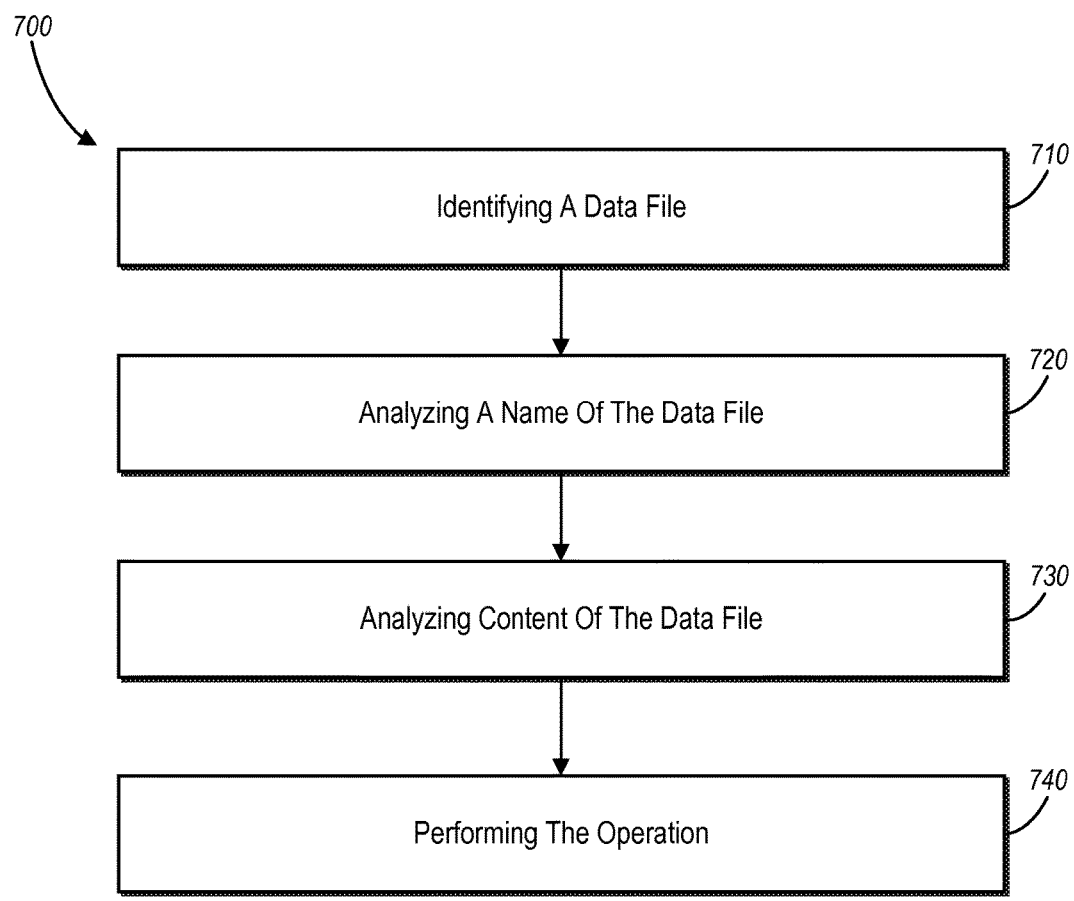
FIG. 7 illustrates a flowchart of a series of acts in another method of automating user operations in accordance with one or more embodiments.

FIG. 6 illustrates a flowchart of a method 600 of automating user operations. The method 600 includes an act 602 of identifying an image file. For example, act 602 can involve identifying the image file 118 from a plurality of data files. To illustrate, the automation system 100 can identify the image file 118 based on one or more data files input into an automation user interface.

The method 600 also includes an act 604 of comparing the image file 118 to a graphical user interface 200, 300. For example, act 604 involves comparing content of the image file 118 to a graphical user interface 200, 300 of the computing device. To illustrate, act 604 can involve using an image matching algorithm to compare the content of the image file 118 to the graphical user interface 200, 300 to determine whether the content of the image file 118 is contained in the graphical user interface 200, 300. Additionally, act 604 can involve comparing an image file 118 to a graphical user interface 200, 300 such as a desktop interface on a personal computing device.

Additionally, the method 600 can include an act 606 of identifying a location of a graphical user interface element 202. For example, act 606 involves identifying a location of a graphical user interface element 202 in the graphical user interface 200, 300 of the computing device corresponding to the content of the image file 118. To illustrate, the graphical user interface element 202 can include an icon, folder, or other unique visual feature of the graphical user interface 200, 300, as shown in FIG. 2A. For example, act 606 can involve comparing the graphical user interface element 202 including the unique visual feature to the graphical user interface 200, 300 to determine whether the graphical user interface element 202 can be found on the graphical user interface 200, 300.

The method 600 further includes an act 608 of analyzing a name of the image file 118. For example, act 608 involves analyzing a name of the image file 118 to identify an operation to be automated. To illustrate, act 608 can involve parsing the name of the image file 118 to identify a priority and a type of the operation. Specifically, act 608 can involve identifying a character string at a predetermined location in the name of the image file 118. Act 608 can involve comparing the character string to a table that includes a plurality of strings that each map to a particular operation. Act 608 can involve mapping the character string to a particular operation to be automated.

As part of act 608, or as an additional act, the method 600 can include processing a plurality of data files in accordance with a priority determined from names of the data files or an order of the files within an automation user interface. For example, the method 600 can process a first data file with a highest priority first then a second data file with a second highest priority second, etc. As shown in FIG. 3C, the automation user interface can identify the priorities of the operations based on numbers in the names of the corresponding data files.

The method 600 also includes an act 610 of performing the operation. For example, act 610 involves performing the operation identified from the name of the image file 118 at the location of the graphical user interface element 202 identified from the content of the image file 118. To illustrate, act 610 can involve performing the operation automatically and without additional user input in response to receiving an indication from a user to begin an automated process. Additionally, act 610 can involve causing the graphical user interface 200, 300 to update based on the performed operation, as shown in FIG. 2D.

As part of act 610, or as an additional act, the method 600 can also include identifying a second image file for performing a second operation identified from a name of the second image file and at a location of a second graphical user interface element in the updated graphical user interface corresponding to the content of the second image file. For example, the method 600 can involve performing a plurality of operations associated with a plurality of data files according to an indicated sequence determined from the names of the data files.

As part of act 610, or as an additional act, the method 600 can include identifying a text file 316 associated with the image file 118. The method 600 can include analyzing a name of the text file 316 to identify a keyboard operation, identifying at least one keystroke command from the content of the text file 316, and executing the at least one keystroke command identified from the content of the text file 316. For example, the method 600 can include identifying, from the text file 316, characters and/or character strings mapped to keystroke commands.

As part of act 610, or as an additional act, the method 600 can further include identifying a folder containing the image file, analyzing a name of the folder to identify a command to continue performing an operation for a predetermined amount of time, and performing the operation identified from the name of the image file 118 for a predetermined amount of time. For example, the method 600 can include performing a mouse or keyboard operation for the duration of the automated process. To illustrate, the method 600 can execute a keystroke command (e.g., "shift") while the method 600 performs an operation associated with the image file 118 and one or more additional data files.

As part of act 610, or as an additional act, the method 600 can include continuously monitoring the graphical user interface 200, 300. The method 600 can detect that the graphical user interface 200, 300 comprises the graphical user interface element 202 corresponding to the content of the image file 118. The method 600 can further include performing the operation in response to detecting the graphical user interface element 202. Thus, the method 600 can actively monitor a graphical user interface 200, 300 without receiving additional input from a user or requiring the user to begin an automated process manually.

FIG. 7 illustrates a flowchart of a method 700 of automating user operations. The method 700 includes an act 702 of identifying a data file. For example, the automation system 100 can identify the image file 118 based on data files input into an automation user interface. Additionally, the data file can include an image file 118, a text file 316 or a folder.

The method 700 also includes an act 704 of analyzing a name of the data file. For example, act 704 involves analyzing a name of the data file to identify an operation to be automated. Additionally, act 704 can involve identifying a plurality of aspects of the operation from the name of the data file. To illustrate, act 704 can involve identifying a separator character (e.g., ".") in the name of the data file, parsing the name of the data file into a first string and a second string based on the separator character, identifying a type of the operation in the first string, and identifying a priority of the operation in the second string, as shown with respect to the automation software 208 in FIG. 2C.

Additionally, the method 700 includes an act 706 of analyzing content of the data file. For example, act 706 involves analyzing content of the data file to determine a context for the operation. To illustrate, the context can indicate a location (e.g., a pixel location) of a graphical user interface element 202 in a graphical user interface 200, 300 of the computing device. Alternatively, the context can indicate a logical location of a key on a keyboard (e.g., associated with a particular keystroke command) in connection with the computing device.

Act 706 can also involve determining that the data file is an image file 118, comparing the content of the image file 118 to a graphical user interface 200, 300 of the computing device, and identifying a location of a graphical user interface element 202 in the graphical user interface 200, 300 of the computing device corresponding to the content of the image file 118. Alternatively, act 706 can involve determining that the data file is a text file, and identifying at least one keystroke command from the content of the text file.

The method 700 also includes an act 708 of performing the operation. For example, act 708 involves performing the operation identified from the name of the data file according to the context determined from the content of the data file. Additionally, act 708 can involve performing a mouse operation, a keyboard operation, or an operation associated with performing one or more other operations. To illustrate, act 708 can involve executing a mouse operation identified from the content of an image file 118, or at least one keystroke command identified from the content of a text file 316.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
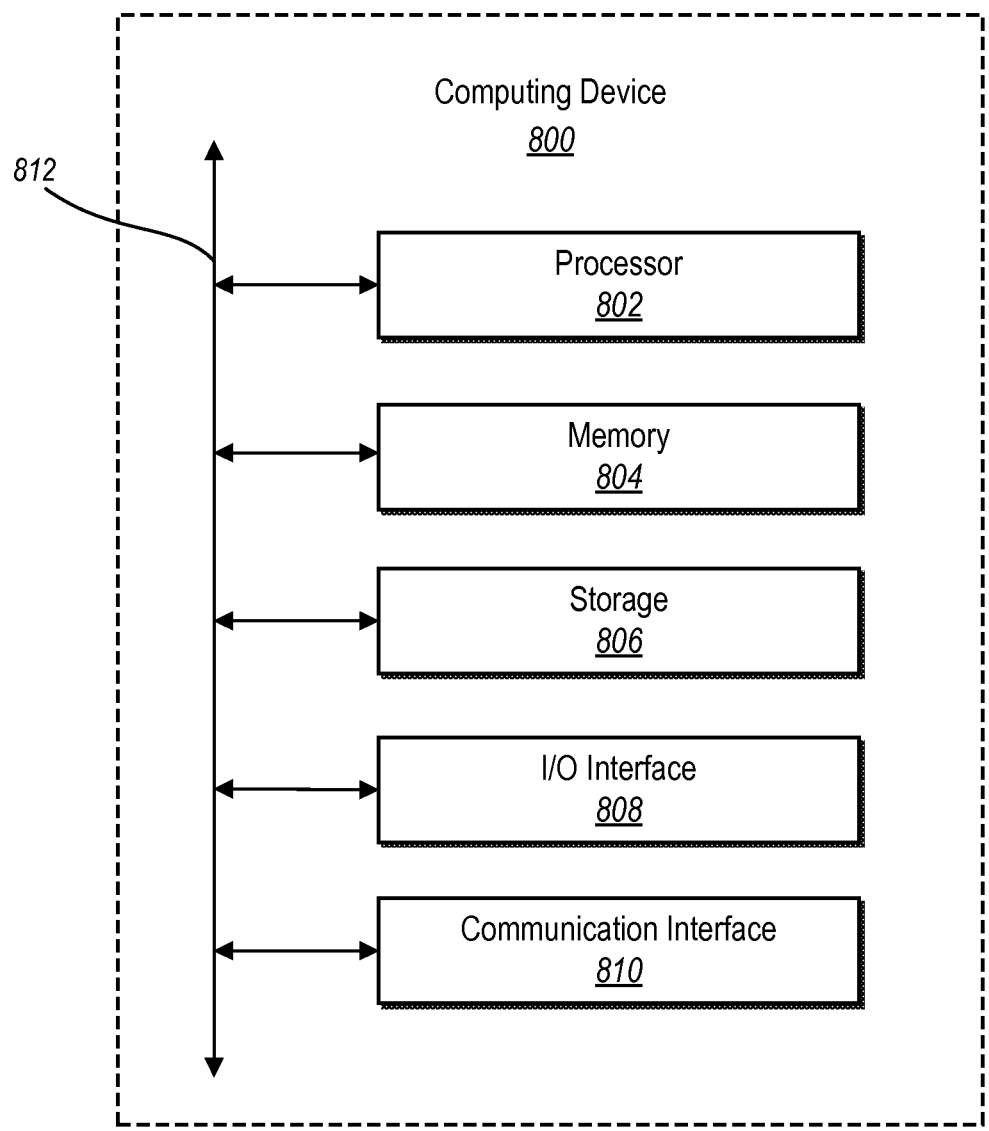
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the automation system 100. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

One or more embodiments may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computer system to:
    identify an image file comprising a name of the image file created in response to generating the image file, the name of the image file comprising an operation to be automated in one or more portions before a file extension of the image file, the operation to be automated comprising an interaction with a graphical user interface element within a graphical user interface, the image file comprising an image of the graphical user interface element on which to perform the operation within the graphical user interface;
    compare pixels of the image file to pixels of a graphical user interface of a computing device to identify the graphical user interface element in the graphical user interface of the computing device;

identify a location of the graphical user interface element in the graphical user interface of the computing device corresponding to the pixels of the image file;

analyze the name of the image file to identify the operation to be automated from the name of the image file; and perform the operation identified from the name of the image file at the location of the graphical user interface element identified from the pixels of the image file.

2. The non-transitory computer readable medium as recited in claim 1, wherein the instructions that, when executed by the at least one processor, cause the computer system to update the graphical user interface in response to performing the operation identified from the name of the image file.

3. The non-transitory computer readable medium as recited in claim 2, further comprising instructions that, when executed by the at least one processor, cause the computer system to:

identify a second image file;

compare pixels of the second image file to the pixels of the updated graphical user interface to identify a second graphical user interface element in the graphical user interface of the computing device;

identify a location of the second graphical user interface element in the updated graphical user interface corresponding to the pixels of the second image file;

analyze a name of the second image file to identify a second operation to be automated; and perform the second operation identified from the name of the second image file at the location of the second graphical user interface element identified from the pixels of the second image file.

4. The non-transitory computer readable medium as recited in claim 1, further comprising instructions that, when executed by the at least one processor, cause the computer system to:

identify a folder containing the image file;

analyze a name of the folder to identify a command from the name of the folder to continue performing the operation for a predetermined amount of time; and perform the operation identified from the name of the image file for the predetermined amount of time.

5. The non-transitory computer readable medium as recited in claim 1, further comprising instructions that, when executed by the at least one processor, cause the computer system to:

continuously monitor the graphical user interface of the computing device;

detect that the graphical user interface comprises the graphical user interface element corresponding to the pixels of the image file; and perform the operation in response to detecting the graphical user interface element.

6. The non-transitory computer readable medium as recited in claim 1, wherein the instructions that, when executed by the at least one processor, cause the computer system to analyze the name of the image file cause the computer system to:

parse the name of the image file to identify a priority and a type of the operation; and identify, at a specific location in the name of the image file, a predetermined character string that maps to the operation.

7. The non-transitory computer readable medium as recited in claim 6, further comprising instructions that, when executed by the at least one processor, cause the computer system to:

identify the image file from a plurality of data files, and process the plurality of data files in accordance with a priority determined from names of the data files.

8. The non-transitory computer readable medium as recited in claim 6, further comprising instructions that, when executed by the at least one processor, cause the computer system to:

identify a text file associated with the image file;

analyze a name of the text file to identify a keyboard operation;

identify at least one keystroke command from content of the text file; and execute the at least one keystroke command identified from the content of the text file.

9. The non-transitory computer readable medium as recited in claim 1, further comprising instructions that, when executed by the at least one processor, cause the computer system to generate, after performing the operation, a log entry comprising a description of the operation, the image file, and an indication that the operation was successful.

10. A non-transitory computer readable storage medium comprising instructions that, when executed by at least one processor, cause a computer system to:

identify a data file comprising a name of the data file created in response to generating the data file, the name of the data file comprising an operation to be automated in one or more portions before a file extension of the data file, the operation to be automated comprising a keyboard operation for interacting with a graphical user interface element within a graphical user interface;

analyze the name of the data file to identify the operation to be automated;

analyze content of the data file to determine a context for the operation by determining that the data file is a text file and identifying at least one keystroke command from content of the text file; and perform the operation identified from the name of the text file according to the context determined from the content of the data file by executing the at least one keystroke command from the content of the text file.

11. The non-transitory computer readable storage medium as recited in claim 10, further comprising instructions that, when executed by the at least one processor, cause the computer system to analyze content of the data file by:

identifying a second data file, wherein the second data file is an image file;

comparing pixels of the image file to pixels of a graphical user interface of a computing device to identify a graphical user interface element in the graphical user interface of the computing device;

identifying a location of a graphical user interface element in the graphical user interface of the computing device corresponding to the pixels of the image file;

analyzing a name of the image file to identify a second operation to be automated, the second operation to be automated comprising an interaction with the graphical user interface element at the location of the graphical user interface element in the graphical user interface; and performing the second operation identified from the name of the image file at the location of the graphical user interface element in the graphical user interface element identified from the pixels of the image file after performing the operation identified from the name of the text file.

12. The non-transitory computer readable storage medium as recited in claim 10, further comprising instructions that, when executed by the at least one processor, cause the computer system to:
   determine that the operation identified from the name of the text file is to be performed on a second data file; and
   perform the operation identified from the name of the text file on the second data file by executing the at least one keystroke command from the content of the text file on the second data file.

13. The non-transitory computer readable storage medium as recited in claim 11, further comprising instructions that, when executed by the at least one processor, cause the computer system to execute the at least one keystroke command from the content of the text file on the second data file by naming the second data file according to the at least one keystroke command.

14. The non-transitory computer readable storage medium as recited in claim 10, further comprising instructions that, when executed by the at least one processor, cause the computer system to execute a plurality of keystroke commands from the content of the text file in an order specified within the text file.

15. The non-transitory computer readable storage medium as recited in claim 10, further comprising instructions that, when executed by the at least one processor, cause the computer system to identify the at least one keystroke command from the content of the text file by identifying an entry for a character or character string mapped to the at least one keystroke command.

16. The non-transitory computer readable storage medium as recited in claim 10, further comprising instructions that, when executed by the at least one processor, cause the computer system to analyze the name of the data file by:
   identifying a separator character in the name of the text file;
   parsing the name of the text file into a first string and a second string based on the separator character;
   identifying a type of the operation in the first string; and
   identifying a priority of the operation in the second string.

17. A system for automating user operations, comprising:
   at least one processor; and
   at least one non-transitory computer readable storage medium storing instructions thereon, that, when executed by the at least one processor, cause the system to:
   identify an image file comprising a name of the image file created in response to generating the image file, the name of the image file comprising an operation to be automated in one or more portions before a file extension of the image file, the operation to be automated comprising an interaction with a graphical user interface element within a graphical user interface, the image file comprising an image of the graphical user interface element on which to perform the operation within the graphical user interface;
   compare pixels of the image file to pixels of a graphical user interface of a computing device to identify the graphical user interface element in the graphical user interface;
   identify a location of the graphical user interface element in the graphical user interface of the computing device corresponding to the pixels of the image file;
   analyze the name of the image file to identify the operation to be automated from the name of the image file; and
   perform the operation identified from the name of the image file at the location of the graphical user interface element identified from the pixels of the image file.

18. The system as recited in claim 17, wherein:
   analyzing the name of the image file comprises parsing the name of the image file to identify the operation to determine a priority and a type of the operation;
   identifying the image file comprises identifying the image file from a plurality of data files, and
   wherein the system further comprises instructions that, when executed by the at least on processor, cause the system to process the plurality of data files in accordance with a priority determined from names of the data files.

19. The system as recited in claim 17, further comprising instructions that, when executed by the at least one processor, cause the system to:
   identify a text file associated with the image file;
   analyze a name of the text file to identify a keyboard operation;
   identify at least one keystroke command from content of the text file; and
   execute the at least one keystroke command identified from the content of the text file.

20. The system as recited in claim 17, further comprising instructions that, when executed by the at least one processor, cause the system to:
   identify a folder containing the image file;
   analyze a name of the folder to identify a command from the name of the folder to continue performing the operation according to a flow control indicated in the name of the folder; and
   perform the operation identified from the name of the image file according to the flow control indicated in the name of the folder.

* * * * *